United States Patent
Xie et al.

(10) Patent No.: US 7,756,161 B2
(45) Date of Patent: Jul. 13, 2010

(54) METHOD AND DEVICE FOR XDSL HYBRID ACCESS

(75) Inventors: Weiping Xie, Guangdong (CN); Qiupeng Zhao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 11/945,806

(22) Filed: Nov. 27, 2007

(65) Prior Publication Data

US 2008/0069143 A1  Mar. 20, 2008

Related U.S. Application Data

(63) Continuation of application No. PCT/CN2006/003023, filed on Nov. 10, 2006.

(30) Foreign Application Priority Data

Nov. 10, 2005  (CN) .................. 2005 1 0101339

(51) Int. Cl.
*H04J 3/24* (2006.01)
(52) U.S. Cl. ............... 370/474; 370/352; 370/395.1
(58) Field of Classification Search .................. None
See application file for complete search history.

(56) References Cited

U.S. PATENT DOCUMENTS

| | | | |
|---|---|---|---|
| 6,208,637 B1 * | 3/2001 | Eames ................. | 370/352 |
| 6,597,689 B1 | 7/2003 | Chiu et al. | |
| 6,640,239 B1 | 10/2003 | Gidwani | |
| 6,829,252 B1 * | 12/2004 | Lewin et al. ........... | 370/493 |
| 2002/0046280 A1 * | 4/2002 | Fujita ................... | 709/227 |
| 2002/0159462 A1 | 10/2002 | Demaria et al. | |
| 2003/0174729 A1 | 9/2003 | Heink et al. | |
| 2003/0226149 A1 * | 12/2003 | Chun et al. ............ | 725/78 |
| 2004/0125809 A1 * | 7/2004 | Jeng ................. | 370/395.53 |
| 2007/0025361 A1 * | 2/2007 | Lin et al. ............... | 370/399 |

FOREIGN PATENT DOCUMENTS

CN    1581812 A    2/2005

OTHER PUBLICATIONS

Transmission and Multiplexing (TM); Access Transmission Systems on Metallic Access Cables; Very High Speed Digital Subscriber Line (VDSL); Part 2: Transceiver Specification; TS 101 270-2" ETSI Standards, Lis, Sophia antipolis Cedex, France, vol. TM-6, No. V1.1.5, Dec. 1, 2000.

* cited by examiner

*Primary Examiner*—Duc C Ho
(74) *Attorney, Agent, or Firm*—Conley Rose, P.C.; Grant Rodolph

(57) ABSTRACT

A method for xDSL hybrid access includes: receiving pseudo cells and standard ATM cells from a subscriber terminal; wherein the pseudo cells carry VDSL data and the standard ATM cells carry ADSL data; reassembling the standard ATM cells into ADSL data frames and reassembling the pseudo cells into VDSL data frames; and transmitting the ADSL data frames and the VDSL data frames to a network side device. A DSLAM for xDSL hybrid access is also provided. The solution proposed may implement the hybrid access of DSL of the ADSL family and the VDSL family.

10 Claims, 3 Drawing Sheets

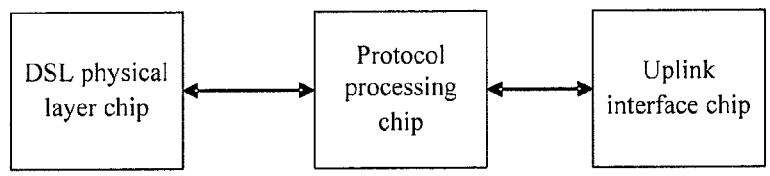
Fig.1
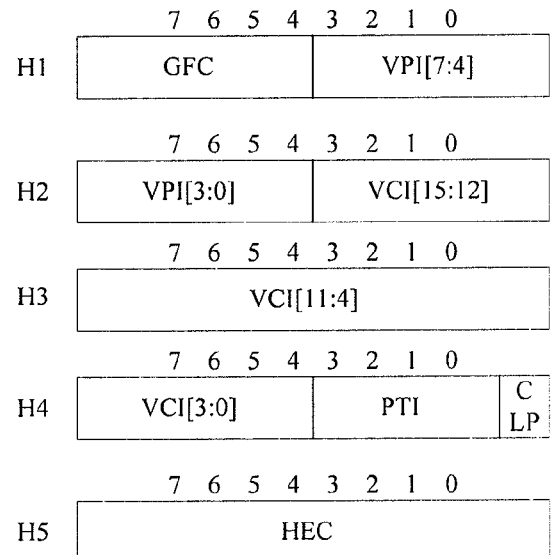
Fig.2
| CIB* | Control Byte |
|---|---|
| H3 | H4 |
| H5 | Padding |
| $Data_0$ | $Data_1$ |
| $Data_2$ | $Data_3$ |
| • | • |
| • | • |
| • | • |
| $Data_{46}$ | $Data_{47}$ |
Fig.3

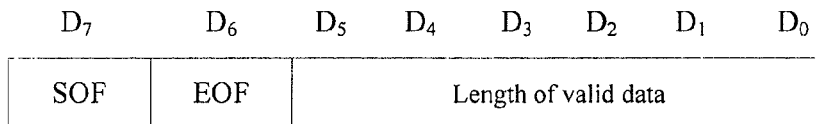
Fig.4
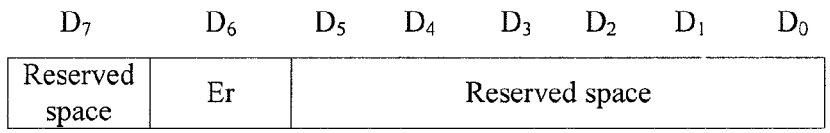
Fig.5
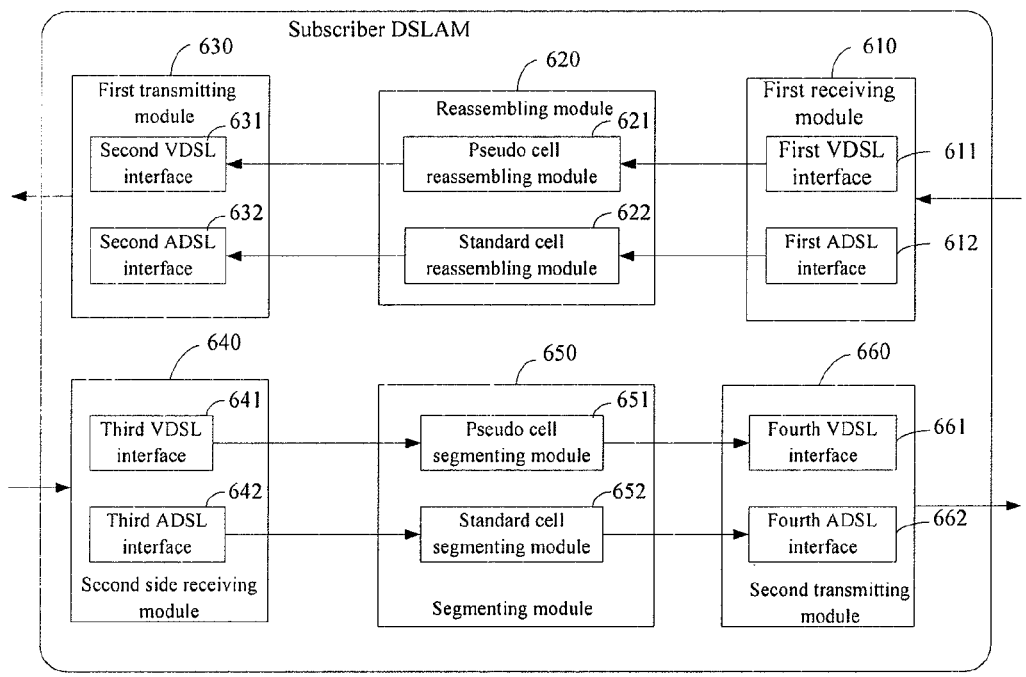
Fig.6
| CPCS PDU | PAD | CPCS_UU | CPI | Length | CRC |
|---|---|---|---|---|---|
|  | 0~47 Byte | 1 Byte | 1 Byte | 2 Byte | 4 Byte |
Fig.7
| Start flag | Address data | Control data | Payload data | CRC field | End flag |
|---|---|---|---|---|---|
| 8 Bits | 8 Bits | 8 Bits | * | 16/32 Bits | 8 Bits |
Fig.8

METHOD AND DEVICE FOR XDSL HYBRID ACCESS

CROSS REFERENCE TO RELATED APPLICATIONS

This application is a continuation of PCT Application PCT/CN2006/003023 filed Nov. 10, 2006 and entitled "Method and Device for XDSL Hybrid Access", which claims priority to Chinese patent application serial number 200510101339.1 filed Nov. 10, 2005 and entitled "Method and Device for XDSL Hybrid Access."

TECHNICAL FIELD

The invention relates to communication technology, and particularly, to a method and equipment for x Digital Subscribe Line (xDSL) hybrid access.

BACKGROUND OF THE INVENTION

Very-high-rate Digital Subscriber Line 2 (VDSL2), a new transmission standard proposed by the ITU-T (International Telecommunication Union-Telecommunication sector) in July 2005, is completely based on Discrete Multiple Tone Line Coding (DMT) technology. VDSL2 not only has a long-distance transmission capability as Asymmetric Digital Subscriber Line 2+ (ADSL2+), but also increases data transmission rate of VDSL from 70M bps (downlink)/30M bps (uplink) to 100M bps (downlink)/100M bps (uplink). VDSL2 combines higher access rate, better Quality of Service (QoS) control and long-distance transmission capability similar to that of ADSL, and soon becomes the focus of new generation access technology.

Operators incline to utilize new technologies, but do not want to upgrade equipment before recovering prior investments. Operators hope to use existing Customer Premises Equipment (CPE), e.g., ADSL2+ modem, when the new VDSL2 technology is employed in access equipment, which leads to stricter requirements for access equipment.

DSL physical layer chips on user boards of the existing Digital Subscriber Line Access Multiplexer (DSLAM) are designed in consideration of compatibility, and are able to support both ADSL2+ and VDSL2 accesses. However, in order to achieve full ADSL2 and VDSL2 compatibility, DSLAM protocol also should be modified adaptively.

As shown in FIG. 1, a user board of a DSLAM device in the prior art includes a DSL physical layer chip, a protocol processing chip and an uplink interface chip. The DLS physical layer chip functions as an interface to network transmission devices, e.g., twisted pairs. The uplink interface chip functions as an interface to subscriber terminal devices. Traffics are transmitted on the twisted pair in data frames, and the traffics processed by the subscriber terminal devices should be in cells, thus the protocol processing chip is used to convert data frames into cells and/or convert cells into data frames. Multiple techniques can be used for the protocol processing.

The first technique used for the protocol processing is Asynchronous Transfer Mode (ATM). The protocol processing chip and the DSL physical layer employ a Universal Test & Operations PHY Interface for Asynchronous Transfer Mode (UTOPIA) to transmit standard ATM cells. The standard ATM cells carry Asynchronous Transfer Mode Adaptation Layer 5 (AAL5) frames. At present the most widely used DSL technologies of the ADSL family, e.g., ADSL, ADSL2 and ADSL2+, all employ this mode. However, ATM can only be used to transmit standard ATM cells, and is thus not suitable to the VDSL technology.

The second technique used for the protocol processing is Packet Transfer Mode (PTM). The protocol processing chip and the DSL physical layer generally employ a Strand Medium Independent Interface (SMII), Medium Independent Interface (MII), or Packet over SONET (POS) interface to transmit High Level Data Link Control (HDLC) frames, Ethernet in the First Mile (EFM) frames, layer-2 or layer 3 packets given by the DSL physical layer by decapsulating the HDLC or EFM frames. Incompatible with the UTOPIA, PTM is suitable for handling HDLC or EFM frames only, thus the PTM is suitable for the DSL technologies of the VDSL family, e.g., VDSL, VDSL2 and VDSL2+, but not for the DSL technologies of the ADSL family.

In order to support both ADSL and VDSL accesses, the protocol processing chip on DSLAM user board should be able to process both standard ATM cells and PTM packets. However, in the prior art standard ATM cells and PTM messages cannot be processed by a same device, thus cannot support both the ADSL family and the VDSL family.

SUMMARY OF THE INVENTION

An embodiment provides a method for xDSL hybrid access to enable an access apparatus to support DSL technologies of both the ADSL family and the VDSL family.

A method for xDSL hybrid access includes:

receiving pseudo cells and standard ATM cells from a subscriber terminal; wherein the pseudo cells carry VDSL data and the standard ATM cells carry ADSL data;

reassembling the standard ATM cells into ADSL data frames and reassembling the pseudo cells into VDSL data frames; and transmitting the ADSL data frames and the VDSL data frames to a network side device.

A Digital Subscriber Line Access Multiplexer (DSLAM) for xDSL hybrid access, includes:

a network side transceiver module, a subscriber side transceiver module, a reassembling module, configured to reassemble the standard ATM cells into ADSL data frames, reassemble the pseudo cells into VDSL data frames, transmit the ADSL data frames and VDSL data frames to a network side transceiver module;

a segmenting module, configured to segment the ADSL data frames into the standard ATM cells, segment the VDSL data frames into the pseudo cells, and transmit the standard ATM cells and the VDSL data frames to the subscriber side transceiver module.

The solution proposed by embodiments of the present invention enables an apparatus to support, via UTOPIA or POS interface, both ATM and PTM as well as the segmentation and reassembly of both standard ATM cells carrying AAL5 frames and pseudo cells carrying HDLC/EFM frames, hence the apparatus can support DSL accesses of both the ADSL family and the VDSL family and the prior investments of users are thus protected.

BRIEF DESCRIPTION OF THE DRAWINGS

FIG. 1 is a schematic diagram showing structure of a DSLAM user board in the prior art;

FIG. 2 is a schematic diagram showing format of a standard ATM cell;

FIG. 3 is a schematic diagram showing format of a pseudo cell provided in an embodiment of the present invention;

FIG. 4 is a schematic diagram showing structure of a CIB field in a pseudo cell provided in an embodiment of the present invention;

FIG. 5 is a schematic diagram showing structure of a Control Byte field in a pseudo cell provided in an embodiment of the present invention;

FIG. 7 is a schematic diagram showing format of a standard AAL5 frame;

FIG. 8 is a schematic diagram showing format of a standard HDLC frame;

FIG. 6 is a schematic diagram showing internal structure of a DSLAM device provided in an embodiment of the present invention.

DETAILED DESCRIPTION OF THE INVENTION

Figure 9:
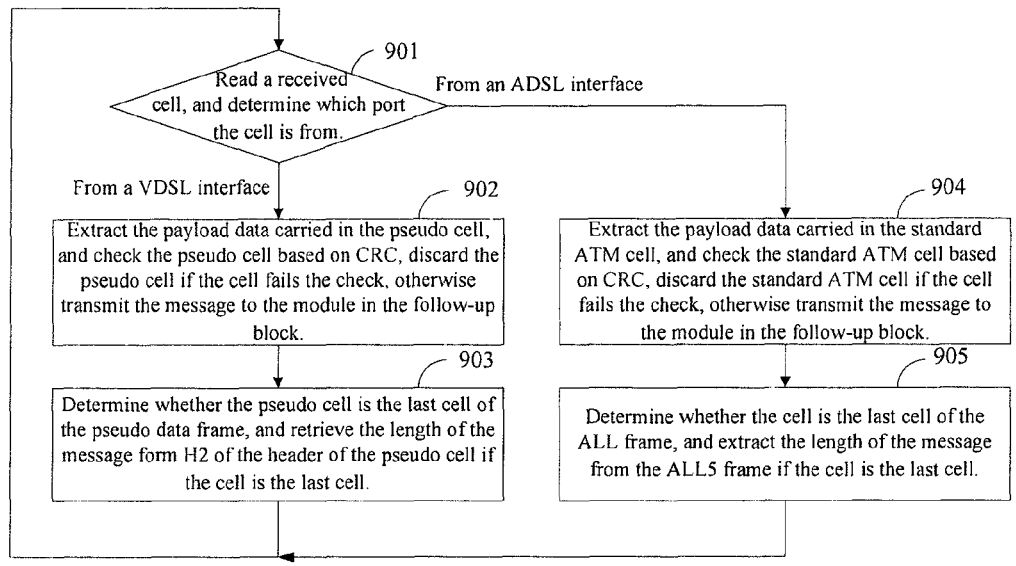
FIG. 9 is a flow chart illustrating a reassembly process provided in an embodiment of this invention.

In accordance with an embodiment of the present invention, the UTOPIA in a DSLAM is designed to support both pseudo ATM cells defined in VDSL2 standard and standard ATM cells. HDLC or EFM frames are carried in pseudo cells and AAL5 frames are carried in standard ATM cells to implement ADSL access. Therefore, the DSLAM can support both ADSL access and VDSL access. Those skilled in the art should understand that UTOPIA can also be replaced with another standard interface, such as POS interface, etc.

Embodiments and the accompanying drawings are hereinafter described in detail.

In an embodiment, a DSLAM supports both ABSL and VDSL accesses. In this embodiment, PTM transmission and ATM transmission used in the present VDSL chip set may be supported at the same time. By using the solution proposed in this embodiment, the technical problem in the prior art that a DSLAM supports only one of ATM and PTM can be solved, thus the existing CPE may still be used even when new access technologies are introduced.

FIG. 2 is a schematic diagram showing format of a standard ATM cell. The header of the ATM cell includes 5 bytes from H1 to H5, used for, in a descending order respectively, Generic Flow Control (GFC, 4 bits), Virtual Path Identifier (VPI, 8 bits), Virtual Channel Identifier (VCI, 16 bits), Payload Type Identified (PTI, 16 bits), Cell Loss Priority (CLP, 1 bits) and Header Error Control (HEC, 8 bits). The PAD byte contains padding, and Data0 to Data47 carry payload of the cell.

FIG. 3 is a schematic diagram showing format of a pseudo cell used for carrying PTM packets in VDSL2. H1 and D6 bit of H2 in the header of the pseudo ATM cell (referred to as pseudo cell hereinafter) carrying VDSL2 frames are used and other fields in header (H3 to H6) are not used. FIG. 4 is a schematic diagram showing structure of a Cell Information Byte (CIB) field of the pseudo cell provided in an embodiment of the present invention. The CIB occupies H1 of the pseudo cell shown in FIG. 3, including in a descending order, Start of Frame Flag (SOF, D7), End of Frame Flag (EOF, D6), and Size of Payload Data (D5 to D1). FIG. 5 is a schematic diagram showing structure of a Control Byte field of the pseudo cell provided in an embodiment of the present invention. The Control Byte field occupies H2 of the pseudo cell shown in FIG. 3, wherein D6 bit of H2 is defined as Er bit and indicates whether decoding of HDLC or EFM frames have errors. Other bits of H2 have not been defined at present.

Since UTOPIA is limited to cell transmission, ADSL is naturally compatible as ADSL (including ADSL2 and ADSL2+) traffics are transmitted via standard ATM cells. However, VDSL traffics should be encapsulated into cells to be compatible with ATM. The cell used for VDSL traffic transmission is not the standard ATM cell, but in a format similar to the ATM cell, and can be called pseudo cell. The pseudo cell is defined to carry HDLC/EFM frames, or Media Access Control (MAC) frames such as layer 2 or layer 3 packets given by the DSL physical layer by decapsulating the HDLC or EFM frames, in order to transmit those frames to the UTOPIA.

The above format of the pseudo cell is just an example, and the format can be defined by different manufacturers. For example, SOF may occupy D7 bit of H1, D7 bit of H3, etc. For another example, some other control fields also may be added in the header of pseudo cell. The detailed format of the pseudo cell is not limited.

As shown in FIG. 6, a DSLAM at user side may include the following function modules.

A first receiving module 610 is configured to receive standard ATM cells or pseudo cells from subscriber terminals through the UTOPIAs. The first receiving module 610 includes at least a first VDSL interface 611 and a first VDSL interface 612, wherein both of the two interfaces are UTOPIA.

A reassembling module 620 is configured to reassemble cells received by the first receiving module 610. The reassembling module 620 includes a pseudo cell reassembling module 621 and a standard cell reassembling module 622. The pseudo cell reassembling module 621 is configured to receive pseudo cells from the first VDSL interface 611, and reassemble the received pseudo cells into HDLC/EFM frames or MAC frames. The standard cell reassembling module 622 is configured to receive standard ATM cells from the first VDSL interface 612, and reassemble the received standard ATM cells into AAL5 frames.

A first transmitting module 630 is configured to send the data frames from the reassembling module 620 to a network side device. The first transmitting module 630 includes a second VDSL interface 631 and a second ADSL interface 632. The second VDSL interface 631 is configured to receive the HDLC/EFM frames or MAC frames reassembled from pseudo cells and send the frames to a network side device. The second ADSL interface 632 is configured to receive the AAL5 frames reassembled from standard ATM cells and send the AAL5 frames to a network side device.

A second side receiving module 640 is configured to receive data frames from network side and send the data frames to a segmenting module 650. The second side receiving module 640 may include a third VDSL interface 641 and a third ADSL interface 642. The third VDSL interface 641 is configured to receive the HDLC/EFM frames or MAC frames from a network device, and the third ADSL interface 642 is configured to receive the AAL frames from a network device.

A segmenting module 650 is configured to segment data frames received by the second side receiving module 640. The segmenting module 650 includes a pseudo cell segmenting module 651 and a standard cell segmenting module 652. The pseudo cell segmenting module 651 is configured to segment the HDLC/EFM frames or MAC frames from the third VDSL interface 641 into pseudo cells, and the standard cell segmenting module 652 is configured to segment the AAL5 frames from the third ADSL interface 642 into standard ATM cells.

A second transmitting module 660 is configured to send standard ATM cells or pseudo cells from the segmenting module 650 to subscriber terminals.

The modules in FIG. 6 are logical modules, and the first VDSL interface 611 and the fourth VDSL interface 661 may correspond to a same port. Similarly, the first VDSL interface 612 and the fourth ADSL interface 662, the second VDSL interface 631 and the third VDSL interface 641, and the second ADSL interface 632 and the third ADSL interface 642 may also correspond to a same port, respectively. Therefore the first transmitting module 630 and the second side receiving module 640 can be implemented in a network side transceiver module, and the first receiving module 610 and the second transmitting module 660 can be implemented in a subscriber side transceiver module.

The above modules are the same as those of ADSL2+, except for the reassembling module and the segmenting module. Since the existing reassembling module and the segmenting module only support the reassembly and segmentation of standard ATM cells, embodiments of the present invention modify the reassembling module and the segmenting module to enable the two modules to process both standard ATM cells and pseudo cells. The DSLAM may have other function modules not shown in FIG. 6.

FIG. 7 is a schematic diagram showing format of a standard AAL5 frame, including fields of Protocol Data Unit (PDU) of Common Part Convergence Sublayer (CPCS), PAD, User-to-User indication (UU) of CPCS, Common part indicator (CPI), Length and Cyclic Redundancy Check (CRC). FIG. 8 is a schematic diagram showing format of a standard HDLC/EFC frame, including a start flag, address data, control data, payload data, CRC field and an end flag.

FIG. 9 is a flow chart illustrating a reassembly process provided in an embodiment of the present invention.

Block 901: read received cells, and perform block 902 if the cells are from a VDSL interface, or perform block 904 if the cells are from an ADSL interface.

The determination of whether a cell is a standard ATM cell or a pseudo cell depends on which port the cell comes from. The cell received from a VDSL interface is determined as a pseudo cell, and the cell received from an ADSL interface is determined as a standard ATM cell. Whether the port is a VDSL interface or an ADSL interface is configured in advance.

Block 902: extract the payload carried in the pseudo cell, and check the pseudo cell based on CRC. If the cell fails in the check, discard the pseudo cell, otherwise transmit the cells to following modules.

Block 903: determine whether the pseudo cell is the last cell of the data frame. If the pseudo cell is the last cell, retrieve length of the frame from the H2 of the pseudo cell and perform Block 901, otherwise directly perform Block 901.

Block 904: retrieve the payload data in the standard ATM cell, and check the standard ATM cell based on CRC. If the cell fails in the check, discard the standard ATM cell, otherwise transmit the standard ATM cell to following modules.

Block 905: determine whether the cell is the last cell of the ALL frame. If the standard ATM cell is the last cell, retrieve length of the ALL5 frame and perform Block 901, otherwise directly perform Block 901.

Since the interface between a DSLAM and a convergence network is an Ethernet interface, cells should be reassembled into frames. As AAL5 frames are encapsulated in standard ATM cells, HDLC frames are encapsulated in pseudo cells, and the formats of the two cell types are different, the reassemblies of the two types of cells are also different. However, the reassembly of EFM frames is the same as that of the HDLC frames.

The reassembly of AAL5 frames is managed based on logic port number, VPI and VCI. The logic port number, VPI and VCI corresponds to UTOPIA. The reassembly of AAL5 frames includes: acquiring an internal connection number and retrieving the AAL5 frames carried in the cells according to the internal connection number for further processing. If UTOPIA is in multi-PHY mode, the logic port number of the UTOPIA is a PHY ID. The mapping from VPI/VCI or the port number to the internal connection number may be configured in advance by the user. The total bits of the logic port number, the VPI and the VCI are 29, and thus it is difficult to be process. Actually the quantity of connections to be processed by the reassembling module is not large (generally 512), so the use of the internal connection number simplifies the process. During the reassembly of AAL5 frames, the payload carried in AAL5 frames is retrieved for saving or processing, and transmitted to the network side.

The reassembly of HDLC frames is managed based on the corresponding logic port number of UTOPIA. The reassembly of HDLC frames includes: acquiring the internal connection number. The mapping from the port number to the inside connection number is also set in advance, and the use of the internal connection number simplifies the process. According to the internal connection number, the HDLC/EFM frames carried in pseudo cells are retrieved for further processing, wherein the HDLC frame could be the content from the address data to the CRC or from the payload data to the CRC, as shown in FIG. 8.

The reassembly of HDLC is the same as that of AAL5, except for following differences.

1) The mapping of the internal connection number in the reassembly of HDLC is different from that of AAL5. The reassembly of AAL5 frames is checked according to the logic port number, VPI and VCI, which are corresponding to the UTOPIA. The reassembly of HDLC/EFM frames is mapped according to the corresponding logic port number of UTOPIA, i.e., an internal connection number is assigned for each PHY port (i.e. logic port) of the UTOPIA.

2) The retrieving of frame length of HDLC is different from that of AAL5. The AAL5 frame length is retrieved from the length field of the AAL5 frame, while the HDLC/EFM frame length is retrieved from the header of the last cell of the data frame. When the EOF of the cell is 1, the cell is the last cell, the value in H1 of the cell shall be retrieved.

3) Frame check of HDLC is different from that of AAL5. The check includes CRC calculation of the received data by the reassembling module, and comparing the calculation result with the CRC field (32 bits) in the received frame. If the two values are identical, the frame passes the check; otherwise the frame fails in the check. The check is performed to verify the validity of the messages and locate the error. A large amount of CRC errors indicate malfunctioning of the link. The ATM schemes in prior art are all based on CPCS CRC while no check method is suggested in the VDSL2 standard.

In the AAL 5 frame check the CRC field of the AAL5 frame is compared with the CRC field calculated by the reassembling module, and the frame is considered to have error if the two are different. In the HDLC/EFM frame check, the last four bytes (the CRC of a MAC frame) of the frame are extracted by the reassembling module to be compared with the CRC generated from the calculation. The check of AAL 5 frames is based on CPCS CRC, while the check of HDLC/EFM frames is based on the Ethernet frame CRC.

Segmentation process is the inverse process of reassembly, whether the frame is an AAL5 frame or an HDLC/EFM frame is determined according to whether the frame is from an ADSL interface or a VDSL interface, and the frame is segmented into standard ATM cells or pseudo cells accordingly.

Figure 10:
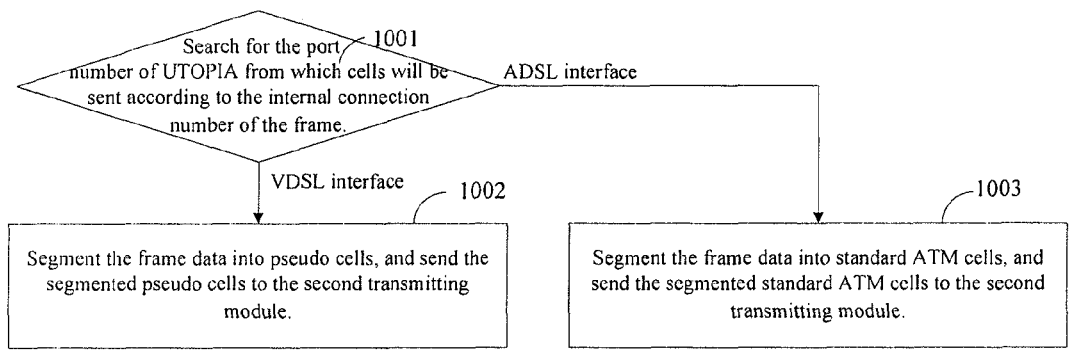
FIG. 10 is a flow chart illustrating a segmentation process provided in an embodiment of this invention.

FIG. 10 is a flow chart illustrating the segmentation process, including blocks shown as follows.

Block 1001: search for the port number of UTOPIA from which cells will be sent according to the internal connection number of the frame, perform block 1002 if the port number corresponds to a VDSL interface, or perform block 1003 if the port number corresponds to an ADSL interface;

Block 1002: segment the frame data into pseudo cells, and send the segmented pseudo cells to the subscriber side transmitter module;

Block 1003: segment the frame data into standard ATM cells, and send the segmented standard ATM cells to the fourth transmitting module;

The reassembly is extracting and framing the frame data carried in cells to be sent to the network side. Therefore information such as the start of frame flag, end of frame flag, frame size, information of whether the frame has errors, etc., is needed. The formats of the pseudo cell and standard ATM cell are different. Thus the ways of extracting the information above are different.

In the extraction of the start of frame flag, as the ATM cell has no start flag, the first cell received is regarded as the start cell of frame, and the cell immediately following the last cell is regarded as the start cell of the second frame. The SOF of the pseudo cell can be directly extracted from the header of the cell to determine the first cell of the pseudo cell.

In the extraction of the end of frame flag, the end of frame flag of the ATM cell is in the last bit of PTI. The EOF of the pseudo cell can be directly extracted in the cell header to get the end of frame flag.

The frame size of the ATM cell can be extracted in the last 5~6 bytes of the last cell of the frame, i.e. the last 5~6 bytes of the AAL5 frame. The frame size of the pseudo cell can be extracted directly in the length field of the last cell header of the frame.

As for the error flag: the ATM cell does not have an independent error flag and depends on HEC field to check whether the ATM cell is correct. CPCS CRC field is employed to detect frame errors. No check standard is defined for the pseudo cell at present, and the pseudo cell is checked based on the CRC field of HDLC/EFM frames.

The main differences between Segmentation And Reassembly (SAR) of the pseudo cell and that of the standard ATM cell lie in:

1. determining whether the cell is a standard ATM cell or a pseudo cell according to the logic port from which the cell received when reassembling;

2. the positions to extract information fields (SOF, EOF, Er, Lengths frame data) when reassembling;

3. determining whether the frame is segmented into standard ATM cells or pseudo cells according to the internal connection number when segmenting;

4. the padding positions of the fields (SOF, EOF, Er, Lengths frame data) when segmenting.

The embodiment of the invention enables an apparatus to support, via UTOPIA or POS interface, the segmentation and reassembly of both standard ATM cells carrying AAL5 frames and pseudo cells carrying HDLC/EFM frames, and to check the received HDLC/EFM frames based on the CRC field of HDLC/EFM frames. Hence the apparatus can support the accesses of both ADSL and VDSL, and the prior investments of users are protected. The DSL of the ADSL family includes ADSL, ADSL2 and ADSL2+, and the DSL of the VDSL family includes VDSL, VDSL2 and VDSL2+.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for x Digital Subscriber Line (xDSL) hybrid access, comprising:
   receiving pseudo cells and standard Asynchronous Transfer Mode (ATM) cells from a subscriber terminal; wherein the pseudo cells carry Very-high-rate Digital Subscriber Line (VDSL) data and the standard ATM cells carry Asymmetric Digital Subscriber Line (ADSL) data;
   reassembling the standard ATM cells into ADSL data frames and reassembling the pseudo cells into VDSL data frames, wherein reassembling the pseudo cells into VDSL data frames comprises determining whether a pseudo cell is a last cell of the VDSL data frame, extracting length of the VDSL data frame from a pseudo cell header if the pseudo cell is the last cell; and
   transmitting the ADSL data frames and the VDSL data frames to a network side device.

2. The method according to claim 1, wherein the ADSL data frames comprise Asynchronous Transfer Mode Adaptation Layer 5 (AAL5) frames, the VDSL data frames comprise High Level Data Link Control (HDLC) frames, Ethernet in the First Mile (EFM) frames, or Media Access Control (MAC) frames formed by layer 2 or layer 3 packets given by de-encapsulating the HDLC or EFM frames.

3. The method according to claim 1, wherein reassembling the pseudo cells into VDSL data frames comprises:
   extracting last four bytes of a pseudo cell;
   comparing the last four bytes with a Cyclic Redundancy Check (CRC) calculation result of the pseudo cell;
   discarding the pseudo cell if the last four bytes are not identical with the CRC calculation result; or
   transmitting the pseudo cell if the last four bytes are identical with the CRC calculation result.

4. The method according to claim 1, further comprising:
   determining cell types of cells received from the subscriber terminal according to type of a port from which the cells are received,
   wherein the cell types comprise a standard ATM cell type and a pseudo cell type.

5. The method according to claim 4, wherein the reassembling standard ATM cells into ADSL data frames and reassembling pseudo cells into VDSL data frames comprises:
   obtaining a first internal connection number based on a first logic port number, Virtual Path Identifier (VPI) and Virtual Channel Identifier (VCI), and extracting the ADSL data frames carried in the standard ATM cells according to the first internal connection number; and
   obtaining a second internal connection number based on a second logic port number of an interface receiving the pseudo cells, and extracting the VDSL data frames carried in the pseudo cells according to the second internal connection number.

6. The method according to claim 1, further comprising:
   receiving the ADSL data frames and the VDSL data frames from a network side device;
   segmenting the ADSL data frames into the standard ATM cells and segmenting the VDSL data frames into the pseudo cells; and transmitting the standard ATM cells and the pseudo cells to the subscriber terminal.

7. The method according to claim 6, further comprising:
determining data frame types of frames received from the network side device according to data frame types of ports receiving the frames;
searching for the logic port number according to an internal connection number of the data frame; and
determining the data frame types of the frames received from the network side device according to the data frame types of ports corresponding to the logic port number.

8. A Digital Subscriber Line Access Multiplexer (DSLAM) for xDSL hybrid access, comprising:
a network side transceiver module;
a subscriber side transceiver module comprising a subscriber side VDSL interface and a subscriber side ADSL interface the network side transceiver module comprises a network side VDSL interface and a network side ADSL interface;
a reassembling module, configured to reassemble standard Asynchronous Transfer Mode (ATM) cells sent by the subscriber side transceiver module into Asymmetric Digital Subscriber Line (ADSL) data frames, reassemble pseudo cells sent by the subscriber side transceiver module into Very-high-rate Digital Subscriber Line (VDSL) data frames, and transmit the ADSL data frames and VDSL data frames to the network side transceiver module, wherein the reassembling module comprises: a pseudo cell reassembling module, configured to receive the pseudo cells from the subscriber side VDSL interface, reassemble the pseudo cells received into the VDSL data frames, and transmit the VDSL data frames to the network side VDSL interface; and a standard ATM cell reassembling module, configured to receive the standard ATM cells from the subscriber side ADSL interface, reassemble the standard ATM cells received into the ADSL data frames, and transmit the ADSL data frames to the network side ADSL interface; and
a segmenting module, configured to segment the ADSL data frames into the standard ATM cells, segment the VDSL data frames into the pseudo cells, and transmit the standard ATM cells and pseudo cells obtained to the subscriber side transceiver module; wherein the segmenting module comprises: a pseudo cell segmenting module, configured to receive the VDSL data frames from the network side VDSL interface, segment the VDSL data frames received into the pseudo cells, and transmit the pseudo cells to the subscriber side VDSL interface; and a standard ATM cell segmenting module, configured to receive the ADSL data frames from the network side ADSL interface, segment the ADSL data frames received into the standard ATM cells, and transmit the standard ATM cells to the subscriber side ADSL interface.

9. The DSLAM according to claim 8, wherein the network side VDSL interface, the network side ADSL interface, the subscriber side VDSL interface and the subscriber side ADSL interface are Universal Test & Operations PHY Interface for Asynchronous Transfer Mode (UTOPIA) or Packet over SONET (POS) interface.

10. The DSLAM according to claim 8, wherein the ADSL data frame is an AAL5 frame and the VDSL data frame is a High Level Data Link Control (HDLC) frame, Ethernet in the First Mile (EFM) frame or Media Access Control (MAC) frame.

* * * * *

UNITED STATES PATENT AND TRADEMARK OFFICE
CERTIFICATE OF CORRECTION

| | |
|---|---|
| PATENT NO. | : 7,756,161 B2 |
| APPLICATION NO. | : 11/945806 |
| DATED | : July 13, 2010 |
| INVENTOR(S) | : Weiping Xie et al. |

It is certified that error appears in the above-identified patent and that said Letters Patent is hereby corrected as shown below:

Column 8, claim 5, line 49, after the word "wherein" delete "the".

Column 9, claim 8, line 17, after the word "interface" insert a --,--.

Signed and Sealed this

Twelfth Day of October, 2010

David J. Kappos
*Director of the United States Patent and Trademark Office*